No. 650,536. Patented May 29, 1900.
A. HOUGH.
PROCESS OF MANUFACTURING SUBSTANCES RESEMBLING MANNITE.
(Application filed Oct. 10, 1899.)
(No Model.)
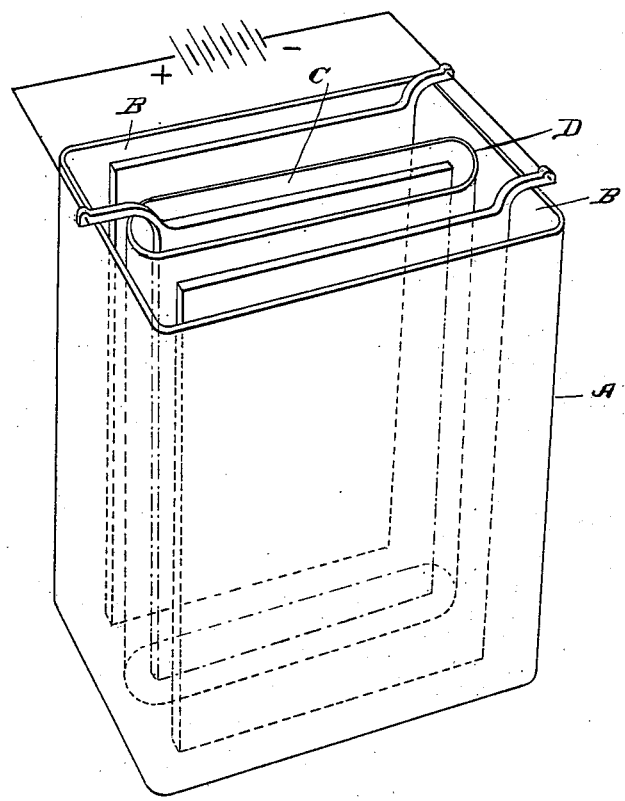
WITNESSES:
INVENTOR.
BY
ATTORNEYS.

UNITED STATES PATENT OFFICE.

ARTHUR HOUGH, OF SAN FRANCISCO, CALIFORNIA, ASSIGNOR TO JAMES O'B. GUNN, OF SAME PLACE.

PROCESS OF MANUFACTURING SUBSTANCES RESEMBLING MANNITE.

SPECIFICATION forming part of Letters Patent No. 650,536, dated May 29, 1900.

Application filed October 10, 1899. Serial No. 733,149. (No specimens.)

*To all whom it may concern:*

Be it known that I, ARTHUR HOUGH, a subject of the Queen of Great Britain, residing at 1335 Golden Gate avenue, in the city and county of San Francisco and State of California, have invented certain new and useful Improvements in Processes for the Manufacture of Substances Resembling Mannite; and I do hereby declare the following to be a full, clear, and exact description of said invention, such as will enable others skilled in the art to which it most nearly appertains to make, use, and practice the same.

This invention relates to improvements in a process for the manufacture of mannite or substances resembling the same.

It consists in subjecting saccharine compounds having a formula of $C_6H_{12}O_6$ or the equivalent when in solution to the electrolytic action of an electric current for the purpose of adding to the original compound one of the elements or gases composing water.

The compound for the treating of which this invention is particularly designed is commercially known as "glucose," the chemical formula for which is $C_6H_{12}O_6$.

The drawing is a diagrammatic view illustrating a form of apparatus for carrying this invention into practice.

The process by which this is treated is as follows: A receiving-tank A is provided, preferably divided into two compartments B and C by a porous partition D, preferably formed from porous clay, through which water may pass. In one of the compartments is placed water and in the other compartment is placed an aqueous solution of glucose. In the compartment containing water is placed a suitable electrode connected to the positive (+) pole of an electric generator, and in the compartment containing the glucose is placed an electrode connected to the negative (−) pole of the electric generator. The current being established, water is decomposed, liberating the two equivalents of hydrogen ($H_2$) at the negative electrode or electrode in the glucose, while oxygen is liberated at the positive electrode. These gases as liberated are in the nascent condition or form, in which they readily combine with other gases or substances for which they have an affinity. In the present instance the nascent hydrogen combines with the glucose, for which it has an affinity, adding thereto the two equivalents of hydrogen liberated from the water. This forms a compound having the formula of $C_6H_{14}O_6$. This compound is soluble in water and remains in solution, from which the solid material may be obtained by evaporation.

While I have herein described the employment of a divided tank, I do not wish to limit myself to its use, as the same effect may be produced by placing both electrodes in the glucose solution. In doing this, however, care must be exercised to place the electrodes sufficiently far apart to prevent the liberated oxygen passing over to the negative electrode, and thereby neutralizing the effect by recombining with the hydrogen.

I am aware that mannite has been formed from glucose solutions by mixing therewith sodium amalgam, and such process I do not claim.

Having thus described this invention, what is claimed is—

1. The process of manufacturing substances resembling mannite consisting in treating an aqueous solution of glucose by subjecting the same to the electrolytic action of an electric current under such conditions as to evolve hydrogen in the solution, substantially as described.

2. The process for manufacturing a substance resembling mannite consisting in providing a receptacle divided in two compartments by a porous partition; then placing an aqueous solution of glucose in one of the said compartments and water in the other; then placing electrodes of an electric circuit in the said compartment; then establishing the electric current through the water and glucose by connecting the electrode in the water-compartment to the positive pole of an electric generator and the electrode in the glucose-compartment to the negative pole of the generator; then after the current has been maintained a sufficient length of time to convert the glucose, drawing off the solution and evaporating the water therefrom, substantially as described.

In testimony whereof I have hereunto set my hand this 28th day of September, 1899.

ARTHUR HOUGH.

Witnesses:
E. F. MURDOCK,
G. W. MARSH.